(12) United States Patent
Kwon (10) Patent No.: US 12,111,447 B2
(45) Date of Patent: Oct. 8, 2024

(54) IMAGING LENS

(71) Applicant: LG INNOTEK CO., LTD., Seoul (KR)

(72) Inventor: Duk Keun Kwon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 460 days.

(21) Appl. No.: 17/310,911

(22) PCT Filed: Feb. 26, 2020

(86) PCT No.: PCT/KR2020/002740
§ 371 (c)(1),
(2) Date: Aug. 30, 2021

(87) PCT Pub. No.: WO2020/184871
PCT Pub. Date: Sep. 17, 2020

(65) Prior Publication Data
US 2022/0121011 A1    Apr. 21, 2022

(30) Foreign Application Priority Data

Mar. 13, 2019    (KR) .................. 10-2019-0028664

(51) Int. Cl.
*G02B 13/00*    (2006.01)
*G02B 9/62*    (2006.01)

(52) U.S. Cl.
CPC .......... *G02B 13/0045* (2013.01); *G02B 9/62* (2013.01)

(58) Field of Classification Search
CPC ............. G02B 13/16; G02B 13/0015; G02B 13/0045; G02B 13/18; G02B 13/04;
(Continued)

(56) References Cited

U.S. PATENT DOCUMENTS

2012/0307382 A1    12/2012    Hsu et al.
2015/0370042 A1    12/2015    Chen et al.
(Continued)

FOREIGN PATENT DOCUMENTS

CN    108205187 A    6/2018
CN    108241199 A    7/2018
(Continued)

OTHER PUBLICATIONS

International Search Report dated Jun. 5, 2020 in International Application No. PCT/KR2020/002740.
(Continued)

*Primary Examiner* — Travis S Fissel
(74) *Attorney, Agent, or Firm* — Saliwanchik, Lloyd & Eisenschenk (57) ABSTRACT

An imaging lens is provided. An imaging lens according to an aspect of the present invention comprises a first lens having negative (−) refractive power, a second lens having positive (+) refractive power, a third lens having positive (+) refractive power, a fourth lens having negative (−) refractive power, a fifth lens having positive (+) refractive power, and a sixth lens having negative (−) refractive power, which are arranged in the order from an object side to an image-side, wherein each of the lenses satisfies the equation tan θd×D>−0.2 (where θd is the maximum half-angle of field of view of an optical system, and D is the degree of distortion at the maximum image height).

20 Claims, 7 Drawing Sheets

(58) Field of Classification Search
CPC ............ G02B 27/0012; G02B 27/0025; G02B 27/0172; G02B 9/62; G02B 9/64; G02B 9/02; G02B 3/0087; H04N 5/2258; H04N 5/222
USPC ......... 359/656–658, 708, 713, 749, 756–762
See application file for complete search history.

(56) References Cited

U.S. PATENT DOCUMENTS

| | | | |
|---|---|---|---|
| 2016/0161717 A1* | 6/2016 | Chae | G02B 13/0045 |
| | | | 359/713 |
| 2017/0108666 A1* | 4/2017 | Lee | G02B 13/0045 |
| 2018/0095249 A1 | 4/2018 | Hsueh et al. | |
| 2018/0329177 A1* | 11/2018 | Chen | G02B 13/002 |

FOREIGN PATENT DOCUMENTS

| | | |
|---|---|---|
| CN | 108873245 A | 11/2018 |
| KR | 10-2017-0054335 A1 | 5/2017 |
| WO | WO-2018/026693 A1 | 2/2018 |
| WO | 2018/103250 A1 | 6/2018 |

OTHER PUBLICATIONS

Office Action dated Mar. 18, 2023 in Chinese Application No. 202080020882.1.
Office Action dated Jun. 7, 2024 in European Application No. 20 769 370.6.
Office Action dated Jul. 14, 2024 in Korean Application No. 10-2019-0028664.

* cited by examiner

| | R | d | N |
|---|---|---|---|
| S11* | -7.67465 | 0.35 | 1.534 |
| S12* | 1.767103 | 0.238919 | |
| S21* | 1.160307 | 0.406332 | 1.614 |
| S22* | 1.667869 | 0.203258 | |
| Stop | infinity | -0.015 | |
| S31 | 5.378481 | 0.682921 | 1.534 |
| S32* | -1.02288 | 0.05 | |
| S41* | -11.2836 | 0.22 | 1.661 |
| S42* | 3.409565 | 0.202232 | |
| S51* | -3.61536 | 1.1 | 1.534 |
| S52* | -0.89732 | 0.03 | |
| S61* | 1.435729 | 0.55 | 1.614 |
| S62* | 0.714108 | 0.517472 | |
| S71 | infinity | 0.11 | 1.517 |
| S72 | infinity | 0.36972 | |
| image | infinity | 0.009146 | |

FIG. 3

| | S11 | S12 | S21 | S22 | S32 |
|---|---|---|---|---|---|
| K | 0 | 0 | 0.371285 | 6.245152 | 0.802534 |
| A | 0.222195 | 0.117854 | -0.20312 | -0.01981 | -0.01676 |
| B | -0.22914 | -0.16314 | -0.03167 | -1.12736 | -0.78488 |
| C | 0.276445 | 0.96866 | -0.03236 | 16.96618 | 21.08075 |
| D | -0.26337 | -3.57566 | 1.888127 | -142.759 | -167.119 |
| E | 0.178949 | 9.001468 | -10.2215 | 663.7481 | 764.2472 |
| F | -0.0787 | -13.5419 | 24.75915 | -1605.51 | -2184.63 |
| G | 0.02001 | 11.15622 | -28.7292 | 1573.046 | 3837.468 |
| H | -0.00223 | -3.76719 | 12.87952 | 18.8819 | -3775.19 |
| J | 0 | 0 | 0 | 0 | 1599.319 |

FIG. 4

|   | S41 | S42 | S51 | S52 | S61 | S62 |
|---|---|---|---|---|---|---|
| K | 0 | 0 | 3.885865 | -0.63276 | -9.94117 | -3.15185 |
| A | -0.56918 | -0.32781 | 0.266551 | 0.188078 | 0.014314 | -0.13881 |
| B | 0.076482 | -0.21385 | -0.83788 | -0.26344 | -0.34713 | 0.040932 |
| C | 8.565812 | 2.975966 | 1.009542 | 0.748271 | 0.465031 | 0.01611 |
| D | -45.704 | -7.39236 | 0.930512 | -1.78056 | -0.37603 | -0.02244 |
| E | 123.5999 | 9.459219 | -3.63039 | 2.738201 | 0.217205 | 0.010659 |
| F | -200.405 | -6.83165 | 4.086465 | -2.55679 | -0.0921 | -0.00283 |
| G | 185.0776 | 2.631676 | -2.32545 | 1.424075 | 0.026578 | 0.000437 |
| H | -74.6049 | -0.41937 | 0.675048 | -0.43155 | -0.00447 | -3.64E-05 |
| J | 0 | 0 | -0.07886 | 0.054379 | 0.000322 | 1.26E-06 |

IMAGING LENS

CROSS-REFERENCE TO RELATED APPLICATIONS

This application is the U.S. national stage application of International Patent Application No. PCT/KR2020/002740, filed Feb. 26, 2020, which claims the benefit under 35 U.S.C. § 119 of Korean Application No. 10-2019-0028664, filed Mar. 13, 2019, the disclosures of each of which are incorporated herein by reference in their entirety.

TECHNICAL FIELD

The present embodiment relates to an imaging lens.

BACKGROUND ART

Recently, storing and transmission of image data, video chatting, and the like are being performed as digital cameras have been mounted in various electronic devices such as vehicle rear cameras, personal computers, laptop computers, mobile phones, PDAs, and the like. Digital cameras that are mounted and used in electronic devices are tend to become smaller and lighter while reducing the cost thereof.

Accordingly, in addition to attempts to realize a high-definition camera by arranging a number of lenses appropriately, miniaturization is promoted by widening the angle of view and narrowing the focal length, but at the same time, researches are actively in progress to achieve more stable optical performance.

DETAILED DESCRIPTION OF THE INVENTION

Technical Subject

The problem to be solved by the present invention is to provide an imaging lens, while being small and lightweight, capable of minimizing image distortion by having an appropriate wide angle of view suitable for realizing a desired image in a camera mounted on various electronic devices or vehicles and the like.

Technical Solution

An imaging lens according to an aspect of the present invention comprises a first lens, a second lens, a third lens, a fourth lens, a fifth lens, and a sixth lens, which are disposed in the order from an object-side to an image-side, wherein each of the lenses satisfies the equation $\tan \theta d \times D > -0.2$, and wherein $\theta d$ is the maximum half-angle of field of view of an optical system, and D is the degree of distortion at the maximum image height.

In addition, each of the lenses may satisfy the following equation $0.7 < TTL/(2 \times Y) < 1.2$, wherein TTL is a distance from the object-side surface of the first lens to an imaging plane, and Y is the maximum image height.

In addition, each of the lenses may satisfy the following equation $1 < TTL/f < 3$, wherein TTL is a distance from the object-side surface of the first lens to the imaging plane, and f is the focal length of the imaging lens.

In addition, the first lens may have a negative refractive power. The negative refractive power may be a negative (−) refractive power.

In addition, the second lens may have a positive refractive power.

In addition, the third lens may have a positive refractive power.

In addition, the fourth lens may have a negative refractive power.

In addition, the fifth lens may have a positive refractive power.

In addition, the sixth lens may have a negative refractive power.

In addition, it may include an aperture disposed between the second lens and the third lens.

In addition, the object-side surface of the first lens may have an inflection point.

Also, the first lens may have a meniscus shape.

In addition, the fourth lens may have a bi-concave shape.

In addition, the object-side surface and the image-side surface of the sixth lens may have an inflection point.

Also, a diameter of the second lens may be smaller than a diameter of the fourth lens.

An imaging lens according to an aspect of the present invention comprises a first lens having a negative (−) refractive power, a second lens having a positive (+) refractive power, a third lens having a positive (+) refractive power, a fourth lens having a negative (−) refractive power, a fifth lens having a positive (+) refractive power, and a sixth lens having a negative (−) refractive power, wherein the first lens to the sixth lens are disposed in the order from an object-side to an image-side, the first lens may be disposed closest to the object-side, the sixth lens may be disposed closest to the image-side, and the image-side surface of the first lens may be formed to be concave in the optical axis.

Advantageous Effects

According to the present embodiment, it is possible to provide an imaging lens capable of remarkably reducing image distortion together with an effect of maintaining a wide angle of view while having small, lightweight, high-definition optical performance.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or disposed in "on (above)" or "below (under)" of each component, "on (above)" or "below (under)" means that it includes not only the case where the two components are directly in contact with, but also the case where one or more other components are formed or disposed between the two components. In addition, when expressed as "on (above)" or "below (under)", the meaning of not only an upward direction but also a downward direction based on one component may be included.

Hereinafter, in describing the configuration of each lens, the term "object-side" means the surface of the lens facing the object-side with respect to the optical axis, and the term "image-side" may refer to a surface of the lens facing the image sensor 900 or the image-side with respect to the optical axis.

In addition, in the present invention, the positive (+) refractive power of the lens may mean a converging lens that converges parallel light and the negative (−) refractive power of the lens may mean a diverging lens that diverges parallel light.

Hereinafter, the present invention will be described in more detail with reference to the accompanying drawings.

Figure 1:
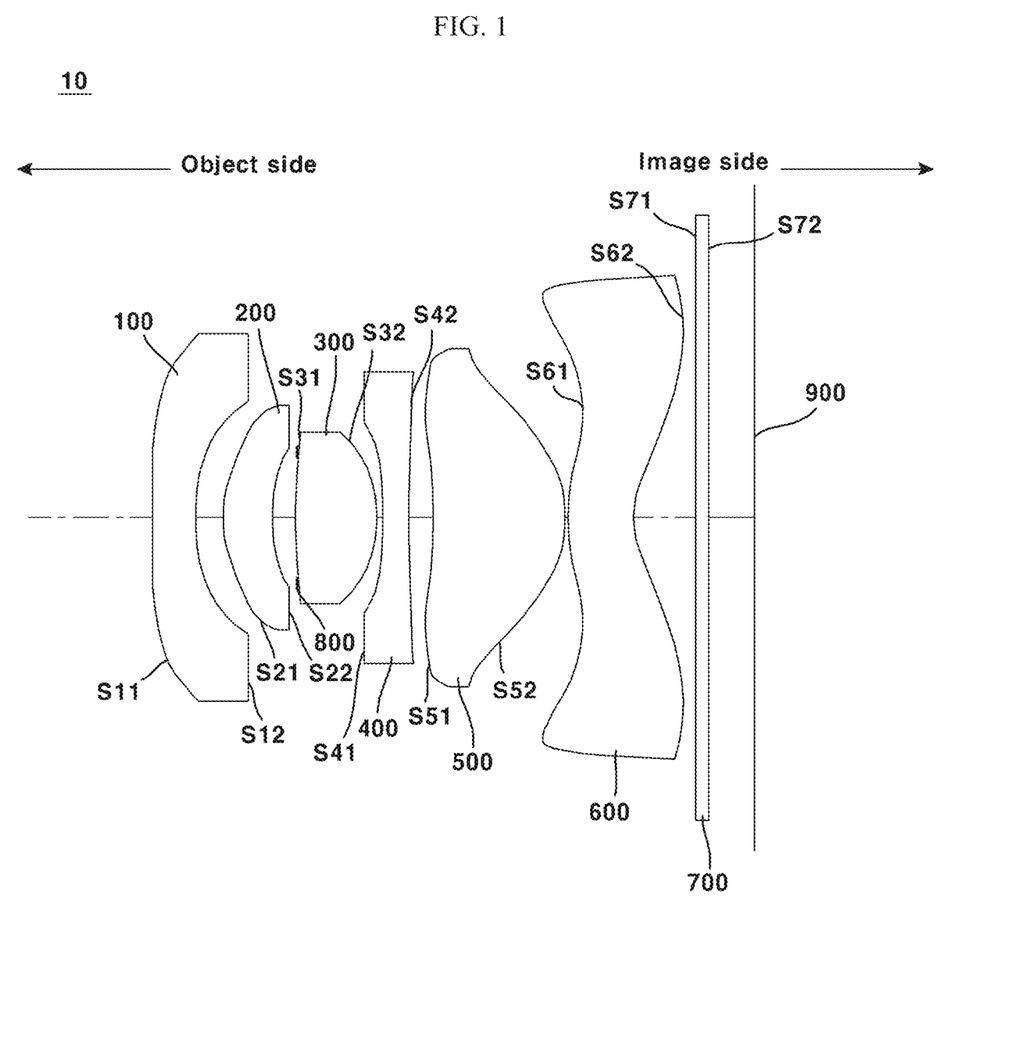
FIG. 1 is a cross-sectional view of an imaging lens according to an embodiment of the present invention.
Figure 2:
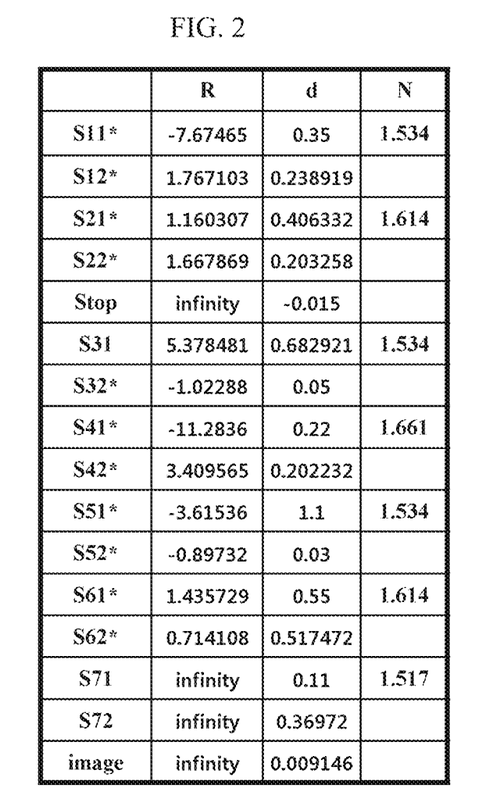
FIG. 2 is a view showing lens data of each lens surface according to an embodiment of the present invention.
Figure 3:
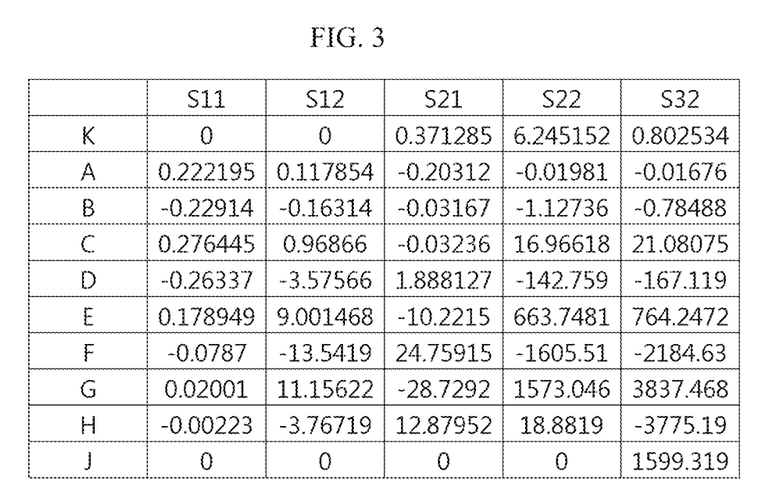
FIGS. 3 and 4 are diagrams illustrating aspheric coefficients of an aspherical lens surface according to an embodiment of the present invention.
Figure 4:
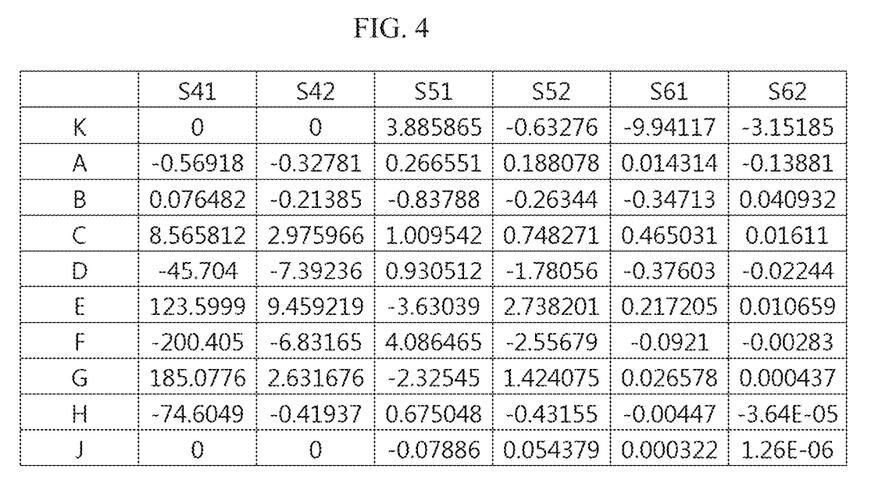
Figure 5:
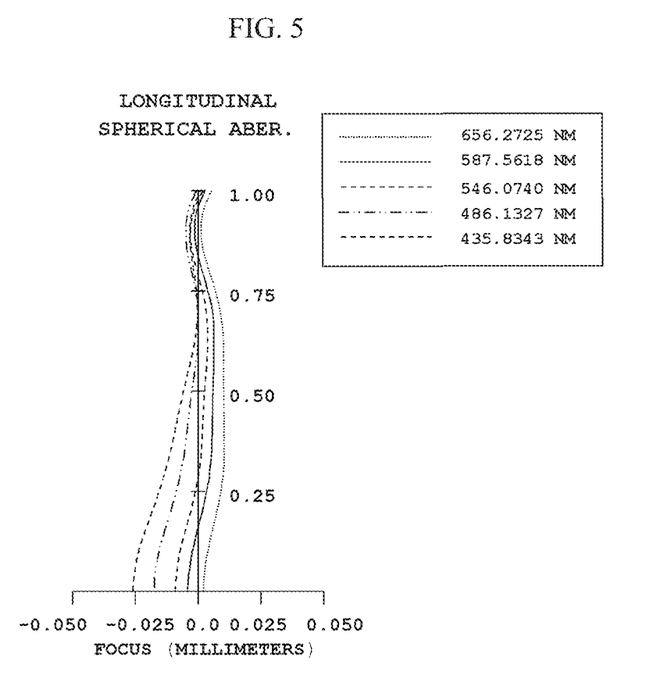
FIG. 5 is a graph of spherical aberration of light passing through an imaging lens according to an embodiment of the present invention.
Figure 6:
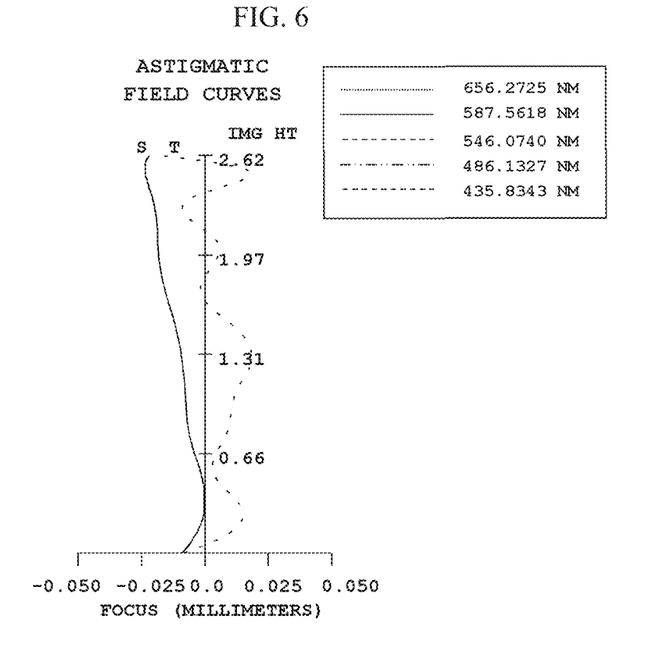
FIG. 6 is an astigmatism graph of light passing through an imaging lens according to an embodiment of the present invention.
Figure 7:
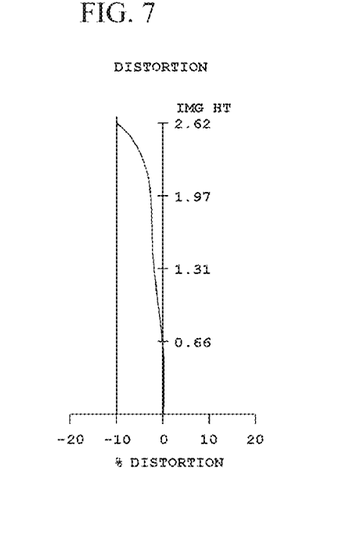
FIG. 7 is a graph of distortion aberration of light passing through an imaging lens according to an embodiment of the present invention.
Figure 8:
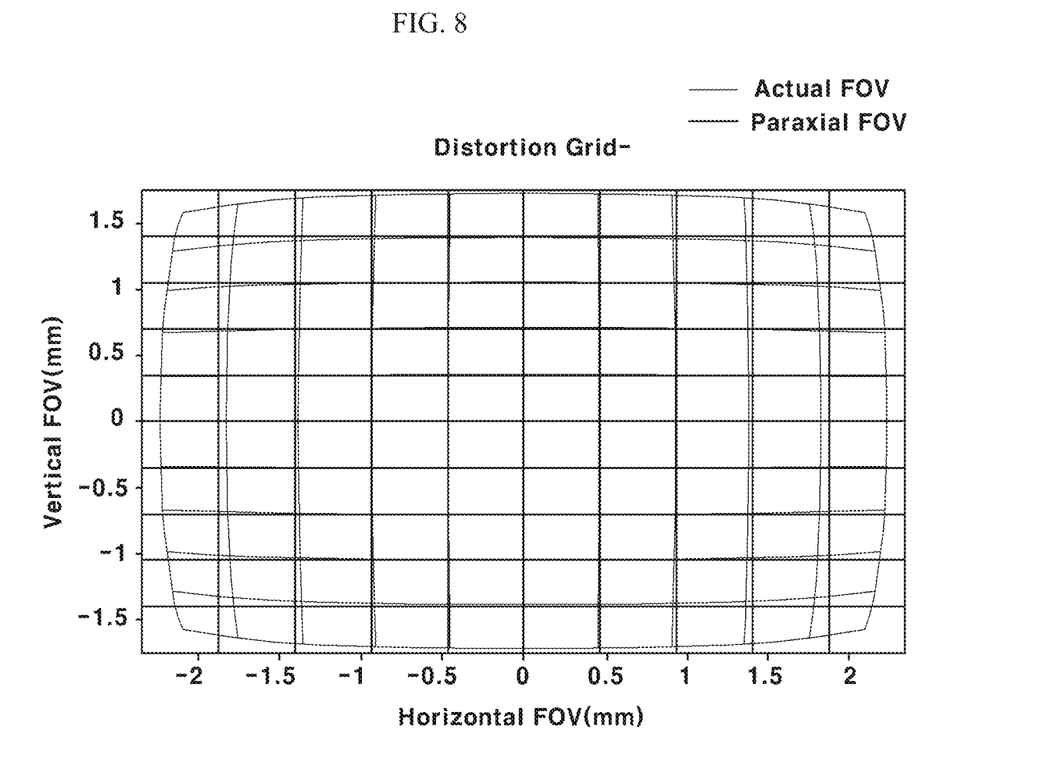
FIG. 8 is a diagram illustrating a degree of distortion of light passing through an imaging lens according to an embodiment of the present invention.
Figure 9:
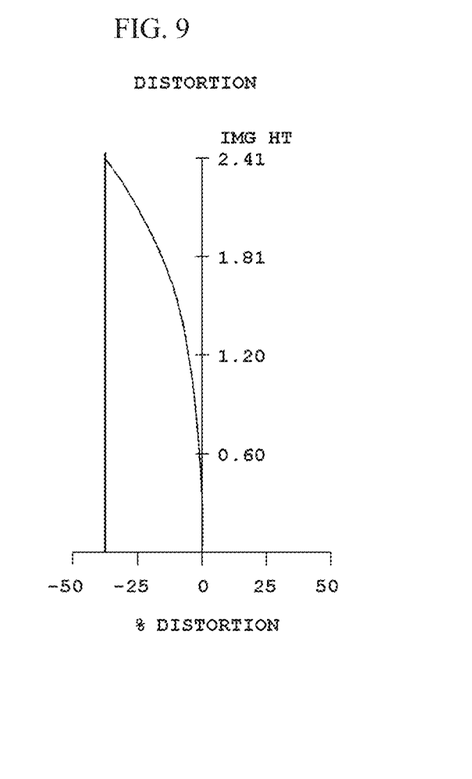
FIG. 9 is a graph of distortion aberration of light passing through an imaging lens according to the prior art.
Figure 10:
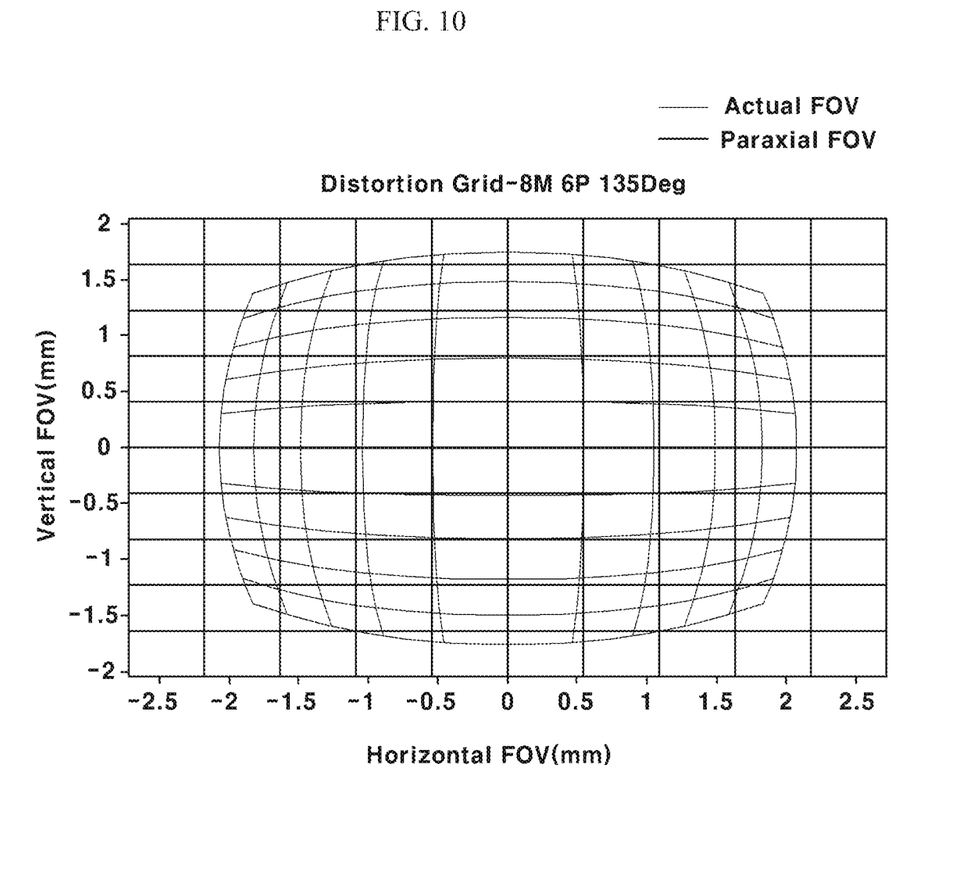
FIG. 10 is a diagram illustrating a degree of distortion of light passing through an imaging lens according to the prior art.

FIG. 1 is a cross-sectional view of an imaging lens according to an embodiment of the present invention. FIG. 2 is a view showing lens data of each lens surface according to an embodiment of the present invention. FIGS. 3 and 4 are diagrams illustrating aspheric coefficients of an aspherical lens surface according to an embodiment of the present invention. FIG. 5 is a graph of spherical aberration of light passing through an imaging lens according to an embodiment of the present invention. FIG. 6 is an astigmatism graph of light passing through an imaging lens according to an embodiment of the present invention. FIG. 7 is a graph of distortion aberration of light passing through an imaging lens according to an embodiment of the present invention. FIG. 8 is a diagram illustrating a degree of distortion of light passing through an imaging lens according to an embodiment of the present invention. FIG. 9 is a graph of distortion aberration of light passing through an imaging lens according to the prior art. FIG. 10 is a diagram illustrating a degree of distortion of light passing through an imaging lens according to the prior art.

In FIG. 1, the thickness, size, and shape of each lens are illustrated exaggeratedly for explanation, and the spherical or aspherical shape is presented as an example only and is not limited thereto.

Referring to FIGS. 1 to 8, the imaging lens 10 according to an embodiment of the present invention includes a first lens 100, a second lens 200, a third lens 300, and a fourth lens 400, a fifth lens 500, a sixth lens 600, a filter 700, an aperture stop 800, and an image sensor 900 may be included, but it may be implemented except for some configurations among these, and additional configurations are not excluded.

A light that corresponds to the image information of a subject is incident on the image sensor 900 sequentially passing through the first lens 100, the second lens 200, the third lens 300, the fourth lens 400, the fifth lens 500, the sixth lens 600, and the filter 700.

The first to sixth lenses 100, 200, 300, 400, 500, and 600 may be sequentially disposed from the object-side to the image-side. The first lens 100 may be disposed closest to the object-side. The sixth lens 600 may be disposed closest to the image-side. The first lens 100 may be disposed on the object-side first. The second lens 200 may be secondly disposed on the object-side. The third lens 300 may be disposed thirdly on the object-side. The fourth lens 400 may be disposed fourthly on the object-side. The fifth lens 500 may be disposed fifthly on the object-side. The sixth lens 600 may be disposed sixthly on the object-side. The sixth lens 600 may be disposed last on the object-side among the plurality of lenses.

The second lens 200 may be disposed between the first lens 100 and the third lens 300. The third lens 300 may be disposed between the second lens 200 and the fourth lens 400. The fourth lens 400 may be disposed between the third lens 300 and the fifth lens 500. The fifth lens 500 may be disposed between the fourth lens 400 and the sixth lens 600. The first lens 100 may be disposed closer to the object-side than the second lens 200. The sixth lens 600 may be disposed closer to the image-side than the fifth lens 500.

The imaging lens according to the present embodiment may include a total of six lenses. As a modified embodiment, any one or more of the first to sixth lenses 100, 200, 300, 400, 500, and 600 may be omitted. A separate lens may be additionally disposed between the first to sixth lenses 100, 200, 300, 400, 500, and 600. A separate lens may be additionally disposed on the object-side of the first lens 100. A separate lens may be additionally disposed on the image-side of the sixth lens 600.

The first lens 100 may have a negative (−) refractive power. The second lens 200 may have a positive (+) refractive power. The third lens 300 may have a positive (+) refractive power. The fourth lens 400 may have a negative (−) refractive power. The fifth lens 500 may have a positive (+) refractive power. The sixth lens 600 may have a negative (−) refractive power. The first to sixth lenses 100, 200, 300, 400, 500, and 600 may be sequentially disposed from the object-side to the image-side. The first lens 100 may be disposed closest to the object-side. The sixth lens 600 may be disposed closest to the image-side.

The object-side surface of the first lens 100 may have a negative radius of curvature in the optical axis. The image-side surface of the first lens 100 may have a positive radius of curvature in the optical axis. The object-side surface of the second lens 200 may have a positive radius of curvature in the optical axis. The image-side surface of the second lens 200 may have a positive radius of curvature in the optical axis. The object-side surface of the third lens 300 may have a positive radius of curvature in the optical axis. The image-side surface of the third lens 300 may have a negative radius of curvature in the optical axis. The object-side surface of the fourth lens 400 may have a negative radius of curvature in the optical axis. The image-side surface of the fourth lens 400 may have a positive radius of curvature in the optical axis. The object-side surface of the fifth lens 500 may have a negative radius of curvature in the optical axis. The image-side surface of the fifth lens 500 may have a negative radius of curvature in the optical axis. The object-side surface of the sixth lens 600 may have a positive radius of curvature in the optical axis. The image-side surface of the sixth lens 600 may have a positive radius of curvature in the optical axis.

The imaging lens 10 according to an embodiment of the present invention may be included in the camera module. In addition, the camera module including the imaging lens 10 according to an embodiment of the present invention may be embedded in various digital devices such as digital cameras, smart phones, notebook computers, and tablet PCs, and particularly in mobile devices so that a high performance, ultrathin zoom lens can be realized.

The imaging lens 10 may include a liquid lens and/or a solid lens. The liquid lens may include a conductive liquid and a non-conductive liquid, and may include a common terminal and a plurality of individual terminals, wherein the focal length can be changed as the shape of the interface formed by the conductive liquid and the non-conductive liquid is changed in response to a driving voltage applied between the common terminal and the individual terminals.

The imaging lens 10 may include a first lens 100. The first lens 100 may have negative or negative (−) refractive power. The refractive index of the first lens 100 may be between 1.5 and 1.6. For example, the refractive index of the first lens 100 may be 1.534. The object-side surface S11 of the first lens 100 may have an inflection point. The inflection point of the object-side surface S11 of the first lens 100 may be formed in a central region of the object-side surface S11 of the first lens 100. The first lens 100 may have a meniscus shape. The object-side surface S11 of the first lens 100 may be concave in the optical axis. As a modified embodiment, the object-side surface S11 of the first lens 100 may be convex toward the object-side. The image-side surface S12 of the first lens 100 may be concave in the optical axis. The diameter of the first lens 100 may be smaller than the diameter of the sixth lens 600. A diameter of the first lens 100 may be larger than a diameter of the second to fourth lenses 200, 300, 400, and 500.

An exposure lens (not shown) may be provided in front of the first lens 100, and a cover glass (not shown) may be disposed in front of the exposure lens. The exposure lens may be protruded out of the holder to be exposed toward the outside, thereby possibly damaging the surface. If the surface of the lens is damaged, the image quality of the image photographed by the camera module may be deteriorated. Accordingly, in order to inhibit or suppress surface damage of the exposure lens, a method of disposing a cover glass or forming a coating layer or configuring the exposure lens with a wear-resistant material to inhibit surface damage may be applied.

The imaging lens 10 may include a second lens 200. The second lens 200 may have positive or positive (+) refractive power. The refractive index of the second lens 200 may be between 1.6 and 1.7. For example, the refractive index of the second lens 200 may be 1.614. The second lens 200 may be formed in a meniscus shape. The object-side surface S21 of the second lens 200 may be convex in the optical axis. The image-side surface S22 of the second lens 200 may be concave in the optical axis. The diameter of the second lens 200 may be larger than the diameter of the third lens 300. The diameter of the second lens 200 may be smaller than the diameter of the first, fourth, fifth, and sixth lenses 100, 400, 500, and 600.

The imaging lens 10 may include a third lens 300. The third lens 300 may have positive or positive (+) refractive power. The refractive index of the third lens 300 may be between 1.5 and 1.6. For example, the refractive index of the third lens 300 may be 1.534. The third lens 300 may be formed in a biconvex shape. The object-side surface S31 of the third lens 300 may be convex in the optical axis. The image-side surface S32 of the third lens 300 may be convex in the optical axis. A diameter of the third lens 300 may be smaller than a diameter of the first, second, fourth, fifth, and sixth lenses 100, 200, 400, 500, and 600.

The imaging lens 10 may include a fourth lens 400. The fourth lens 400 may have negative or negative (−) refractive power. The refractive index of the fourth lens 400 may be between 1.6 and 1.7. For example, the refractive index of the fourth lens 400 may be 1.661. The fourth lens 400 may be formed in a concave shape. The object-side surface S41 of the fourth lens 400 may be concave in the optical axis. The image-side surface S42 of the fourth lens 400 may be concave in the optical axis. The diameter of the fourth lens 400 may be larger than the diameters of the second and third lenses 200 and 300. The diameter of the fourth lens 400 may be smaller than the diameter of the first, fifth, and sixth lenses 100, 500, and 600.

The imaging lens 10 may include a fifth lens 500. The fifth lens 500 may have positive or positive (+) refractive power. The refractive index of the fifth lens 500 may be between 1.5 and 1.6. For example, the refractive index of the fifth lens 500 may be 1.534. The fifth lens 500 may be formed in a meniscus shape. The object-side surface S51 of the fifth lens 500 may be concave in the optical axis. The image-side surface S52 of the fifth lens 500 may be convex in the optical axis. The diameter of the fifth lens 500 may be larger than the diameter of the second to fourth lenses 200, 300, and 400. The diameter of the fifth lens 500 may be smaller than the diameters of the first and sixth lenses 100 and 600.

The imaging lens 10 may include a sixth lens 600. The sixth lens 600 may have negative or negative (−) refractive power. The refractive index of the sixth lens 600 may be between 1.6 and 1.7. For example, the refractive index of the sixth lens 600 may be 1.614. The object-side surface S61 of the sixth lens 600 may have an inflection point. The image-side surface S62 of the sixth lens 600 may have an inflection point. The object-side surface S61 of the sixth lens 600 may be convex in the optical axis. The image-side surface S62 of the sixth lens 600 may be concave in the optical axis. The sixth lens 600 may have a larger diameter than the first to fifth lenses 100, 200, 300, 400, and 500

The imaging lens 10 may include a filter 700. The filter 700 may be disposed closer to the image-side than the sixth lens 600. The filter 700 may be at least one of an infrared filter and a cover glass. When an infrared filter is applied as the filter 700, radiant heat emitted from external light may be blocked from being transferred to the light receiving element. In addition, the infrared filter transmits visible light and reflects infrared light to the outside.

The imaging lens 10 may include an aperture 800. In an embodiment of the present invention, the aperture 800 may refer to a disk-shaped device that controls the amount of light passing through the imaging lens 10 by adjusting a hole. The aperture 800 may be disposed between the second lens 200 and the third lens 300. Specifically, the aperture 800 may be disposed adjacent to the object-side surface S31 of the third lens 300. For example, the aperture 800 may be overlapped with at least a portion of the object-side surface S31 of the third lens 300 in a direction perpendicular to the optical axis.

The imaging lens 10 may include an image sensor 900. The image sensor 900 may include a charge coupled device (CCD) or a complementary metal oxide semiconductor (CMOS). A horizontal and/or vertical length of a unit pixel of the image sensor 900 may be 2 μm or less. Through this, it is possible to provide an imaging lens 10 that can be applied to a camera module having a high number of pixels and/or pixels.

The imaging lens 10 according to an embodiment of the present invention may satisfy Equation 1 below.

$$\tan \theta d \times D > -0.2 \qquad \text{<Equation 1>}$$

In here, θd is the maximum half-angle of field of view of the optical system, and D is the degree of distortion at the maximum image height.

The angle of view refers to the angle formed by the imageable range with respect to the lens center, and the half angle of view refers to the angle formed with the radical axis passing through the center of the lens as half the angle of view. Degree is used as the unit of Od. The height of the image means the height of the image formed on the imaging plane, and the unit is mm.

In an embodiment of the present invention, Od may be 60 degrees, and D may be −0.1.

The imaging lens 10 according to an embodiment of the present invention may satisfy Equation 2 below.

$$0.7 < TTL/(2 \times Y) < 1.2 \qquad \text{<Equation 2>}$$

In here, TTL is the distance from the object-side surface of the first lens to the imaging plane, and Y is the maximum image height.

In an embodiment of the present invention, TTL may be 5.05, and Y may be 2.62.

The imaging lens 10 according to an embodiment of the present invention may satisfy Equation 3 below.

$$1 < TTL/f < 3 \qquad \text{<Equation 3>}$$

In here, TTL is the distance from the object-side surface of the first lens to the imaging plane, and f is the focal length of the imaging lens.

In an embodiment of the present invention, TTL may be 5.05 and f may be 1.78.

When at least one of Equations 1 to 3 is satisfied, it is possible to provide an imaging lens 10 that can be applied to a camera module for a mobile or smart phone with a high pixel and/or number of pixels.

In FIG. 2, R denotes a radius of curvature, d denotes a thickness of a lens, or a distance between each lens, or a distance between a corresponding lens and an image and an object, and N denotes a refractive index of each lens. And, * indicates an aspherical lens.

The aspherical coefficients A, B, C, D, E, F, G, H, and J shown in FIG. 3 satisfy the following Equation 4.

$$Z = \frac{cY^2}{1 + \sqrt{1 - (1+K)c^2 Y^2}} + \qquad \text{<Equation 4>}$$
$$AY^4 + BY^6 + CY^8 + DY^{10} + EY^{12} + FY^{14} + \ldots$$

In here, Z is the distance from the apex of the lens in the direction of the optical axis, Y is the distance in the direction perpendicular to the optical axis, c is the reciprocal of the radius of curvature at the apex of the lens, k is the conic constant, and A, B, C, D, E, F, G, H, and J mean aspheric coefficients.

Referring to FIGS. 9 and 10, the degree of distortion of light passing through the conventional imaging lens may be −30%, that is, −0.3.

Referring to FIGS. 7 and 8, the distortion of light passing through the imaging lens 10 of the present invention may be −10%, that is, −0.1. That is, the imaging lens 10 according to an embodiment of the present invention can be applied to a high resolution camera module by reducing the amount of distortion while satisfying the wide angle.

The embodiments of the present invention have been described above with reference to the accompanying drawings, but a person skilled in the art to which the present invention belongs may understand that the present invention can be implemented in other specific forms without changing the technical spirit or essential features. Therefore, it should be understood that the embodiments described above are illustrative and non-limiting in all respects.

The invention claimed is:

1. An imaging lens comprising:
   a first lens having negative (−) refractive power;
   a second lens having positive (+) refractive power;
   a third lens having positive (+) refractive power;
   a fourth lens having negative (−) refractive power;
   a fifth lens having positive (+) refractive power; and
   a sixth lens,
   wherein the first to sixth lenses are disposed in order from an object-side to an image-side,
   wherein the imaging lens satisfies an equation:

$$\tan \theta d \times D > -0.2,$$

wherein θd is a maximum half-angle of field of view of an optical system, and D is a degree of distortion at a maximum image height,
   wherein a radius of curvature of an object-side surface of the first lens is negative at an optical axis,
   wherein a radius of curvature of an object-side surface of the fourth lens is negative at the optical axis, and
   wherein a radius of curvature of an object-side surface of the fifth lens is negative at the optical axis.

2. The imaging lens of claim 1, satisfying an equation:

$$0.7 < TTL/(2 \times Y) < 1.2,$$

wherein TTL is a distance from an object-side surface of the first lens to an imaging plane, and Y is a maximum image height.

3. The imaging lens of claim 1, satisfying an equation:

$1 < TTL/f < 3$, wherein TTL is a distance from the object-side surface of the first lens to an imaging plane, and f is a focal length of the imaging lens.

4. The imaging lens of claim 1, wherein a radius of curvature of an image-side surface of the second lens is positive at the optical axis.

5. The imaging lens of claim 1, wherein a radius of curvature of an object-side surface of the third lens is positive at the optical axis.

6. The imaging lens of claim 1, wherein a radius of curvature of an image-side surface of the third lens is negative at the optical axis.

7. The imaging lens of claim 1, wherein, at the optical axis, a distance between the first lens and the second lens is greater than a distance between the fourth lens and the fifth lens.

8. The imaging lens of claim 1, comprising an aperture disposed between the second lens and the third lens.

9. The imaging lens of claim 1, wherein the sixth lens has a negative (−) refractive power.

10. An imaging lens comprising:
a first lens having negative (−) refractive power;
a second lens having positive (+) refractive power;
a third lens having positive (+) refractive power;
a fourth lens having negative (−) refractive power;
a fifth lens having positive (+) refractive power; and
a sixth lens having negative (−) refractive power,
wherein the first to sixth lenses are disposed in order from an object-side to an image-side,
wherein the first lens is disposed closest to the object-side, and the sixth lens is disposed closest to the image-side,
wherein an image-side surface of the first lens is formed to be concave at an optical axis,
wherein a radius of curvature of an object-side surface of the first lens is negative at the optical axis,
wherein a radius of curvature of an object-side surface of the fourth lens is negative at the optical axis, and
wherein a radius of curvature of an object-side surface of the fifth lens is negative at the optical axis.

11. The imaging lens of claim 1, wherein a radius of curvature of an image-side surface of the first lens is positive at the optical axis.

12. The imaging lens of claim 1, wherein a radius of curvature of an object-side surface of the second lens is positive at the optical axis.

13. The imaging lens of claim 1, wherein a radius of curvature of an image-side surface of the fourth lens is positive at the optical axis.

14. The imaging lens of claim 1, wherein a radius of curvature of an image-side surface of the fifth lens is negative at the optical axis.

15. The imaging lens of claim 1, wherein, at the optical axis, a distance between the third lens and the fourth lens is greater than a distance between the fifth lens and the sixth lens.

16. A camera module comprising the imaging lens of claim 1.

17. An imaging lens comprising:
a first lens having negative (−) refractive power;
a second lens having positive (+) refractive power;
a third lens having positive (+) refractive power;
a fourth lens having negative (−) refractive power;
a fifth lens having positive (+) refractive power; and
a sixth lens having negative (−) refractive power,
wherein the first to sixth lenses are disposed in order from an object-side to an image-side,
wherein, at an optical axis, a distance between the third lens and the fourth lens is greater than a distance between the fifth lens and the sixth lens,
wherein a radius of curvature of an object-side surface of the first lens is negative at the optical axis,
wherein a radius of curvature of an object-side surface of the fourth lens is negative at the optical axis, and
wherein a radius of curvature of an object-side surface of the fifth lens is negative at the optical axis.

18. The imaging lens of claim 17, wherein a radius of curvature of an object-side surface of the second lens is positive at the optical axis, and
wherein a radius of curvature of an image-side surface of the second lens is positive at the optical axis.

19. The imaging lens of claim 17, wherein a radius of curvature of an image-side surface of the fourth lens is positive at the optical axis.

20. The imaging lens of claim 17, wherein a radius of curvature of an image-side surface of the fifth lens is negative at the optical axis.

* * * * *